（12） United States Patent
Kitayama

(10) Patent No.: US 6,408,071 B1
(45) Date of Patent: Jun. 18, 2002

(54) MODEM LINE CONNECTION CIRCUIT AND THE CONTROL CIRCUIT

(75) Inventor: Minoru Kitayama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/564,861

(22) Filed: May 4, 2000

(30) Foreign Application Priority Data

May 7, 1999 (JP) ............................................ 11-126982

(51) Int. Cl.[7] .......................... H04M 1/00; H04M 11/00
(52) U.S. Cl. ............. 379/412; 379/399.01; 379/193.05; 379/90.01; 379/93.01
(58) Field of Search .............................. 379/93.29, 399, 379/387, 398, 28–31, 93.05–93.37, 412–418; 375/222

(56) References Cited

U.S. PATENT DOCUMENTS

| | | | | |
|---|---|---|---|---|
| 4,723,267 A | * | 2/1988 | Jones et al. ................. | 379/93.5 |
| 5,504,807 A | * | 4/1996 | Sattler et al. ................. | 379/98 |
| 5,734,703 A | * | 3/1998 | Hiyoshi ....................... | 379/98 |
| 5,802,151 A | * | 9/1998 | Bevill, Jr. et al. ....... | 379/93.05 |
| 5,859,557 A | * | 1/1999 | Schley-May ................ | 327/333 |
| 6,088,446 A | * | 7/2000 | Huang ......................... | 379/412 |

* cited by examiner

Primary Examiner—Forester W. Isen
Assistant Examiner—Ramnandan Singh
(74) Attorney, Agent, or Firm—Young & Thompson

(57) ABSTRACT

Disclosed is a modem line connection circuit for connecting with public telephone line, which has: a simulated inductance circuit composing a dry transformer; a current-limiting circuit which limits excess current to flow through the simulated inductance circuit; and an indicator circuit which detects the flow of excess current in response to the operation of the current-limiting circuit and indicates the detection of excess current. Also, the circuit has a switch which makes the operation of the modem line connection circuit stop when the current-limiting circuit operates.

12 Claims, 5 Drawing Sheets

101 CONTROL SIGNAL
TO SWITCH 33

MODEM LINE CONNECTION CIRCUIT AND THE CONTROL CIRCUIT

FIELD OF THE INVENTION

This invention relates to a modem line connection circuit and the control circuit, and more particularly to, a modem line connection circuit that is suitable to connect with public telephone line and the control circuit.

BACKGROUND OF THE INVENTION

Conventionally, modem line connection circuits use a method of using a wet transformer where direct current of public telephone line is allowed to flow directly to the transformer, and a method of using a dry transformer where direct current is prevented from flowing directly to the transformer by using a simulated inductance.

At present, the method of using a dry transformer, in which it is easy to miniaturize the mounting circuit, is used typically.

FIG. 1 shows a line connection circuit to use a dry transformer. In this line connection circuit, a connection line 31 is disposed between a connector 30 and a transformer 36. Also, a series circuit composed of a connection line 32, a line switch 33 and a capacitor 35 is disposed between the connector 30 and the transformer 36. Further, a simulated inductance circuit 80 is disposed between the connection line 31 and a connection node N3 for the line switch 33 and the capacitor 35. Capacitor 34 is located between line 31 and capacitor 35.

FIG. 2 shows the details of the simulated inductance circuit 80. Terminal B1 of a diode bridge 11 for rectifying polarity inversion current of line is connected to the connection line 31, and terminal B2 of the diode bridge 11 is connected to the connection line 32. The cathode of a Zener diode 13 is connected to terminal B3 of the diode bridge 11, and the anode of the Zener diode 13 is connected through a resistance 17 to terminal B4 of the diode bridge 11. Also, a resistance 15 is parallel connected to the Zener diode 13, and a capacitor 14 is parallel connected to the resistance 17. Further, the anode of the Zener diode 13 is connected to the base of a Darlington-connected transistor Tr1, and the collectors of Darlington-connected transistors Tr1, Tr2 are connected to the cathode of the Zener diode 13. Also, the emitter of Darlington-connected transistor Tr2 is connected through a resistance 18 to terminal B4 of the diode bridge 11.

When the modem line connection circuit thus composed is connected to public telephone line, excess current is not likely to flow through the modem line connection circuit since in the public telephone line the length of line is elongated due to the connection up to the exchange office and therefore the component of DC resistance is large.

However, in PBX digital line, the length of line is short and the component of DC resistance is therefore small because there exists only the interior wiring. Therefore, when the above modem line connection circuit is connected to such a PBX digital line erroneously, excess current is likely to flow through the modem line connection circuit. Also, the form of connector to connect with the modem device is similar each other, therefore it is difficult to find the difference. Thus, there is a problem that when the modem line connection circuit is carelessly connected not to public telephone line but PBX digital line, excess current may flow in use and the mode line connection circuit may be therefore destroyed.

SUMMARY OF THE INVENTION

Accordingly, it is an object of the invention to provide a modem line connection circuit and the control method that, even when the circuit is connected to PBX digital circuit by mistake, can be prevented from being destroyed and the user can be promoted to stop the use.

It is a further object of the invention to provide a modem line connection circuit and the control method that even when the circuit is connected to PBX digital circuit by mistake, can be prevented from being destroyed and the operation of circuit can be stopped automatically to prevent the failure of circuit surely.

According to the invention, a modem line connection circuit for connecting with public telephone line, comprises:

a simulated inductance circuit composing a dry transformer;

a current-limiting circuit which limits excess current to flow through the simulated inductance circuit; and an indicator circuit which detects the flow of excess current in response to the operation of the current-limiting circuit and indicates the detection of excess current.

According to another aspect of the invention, a control method for a modem line connection circuit for connecting with public telephone line provided with a simulated inductance circuit composing a dry transformer, comprises the steps of:

detecting excess current to flow through a Darlington circuit composing the simulated inductance circuit and then limiting the excess current up to a predetermined current; and indicating the flow of excess current when the excess current is detected.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
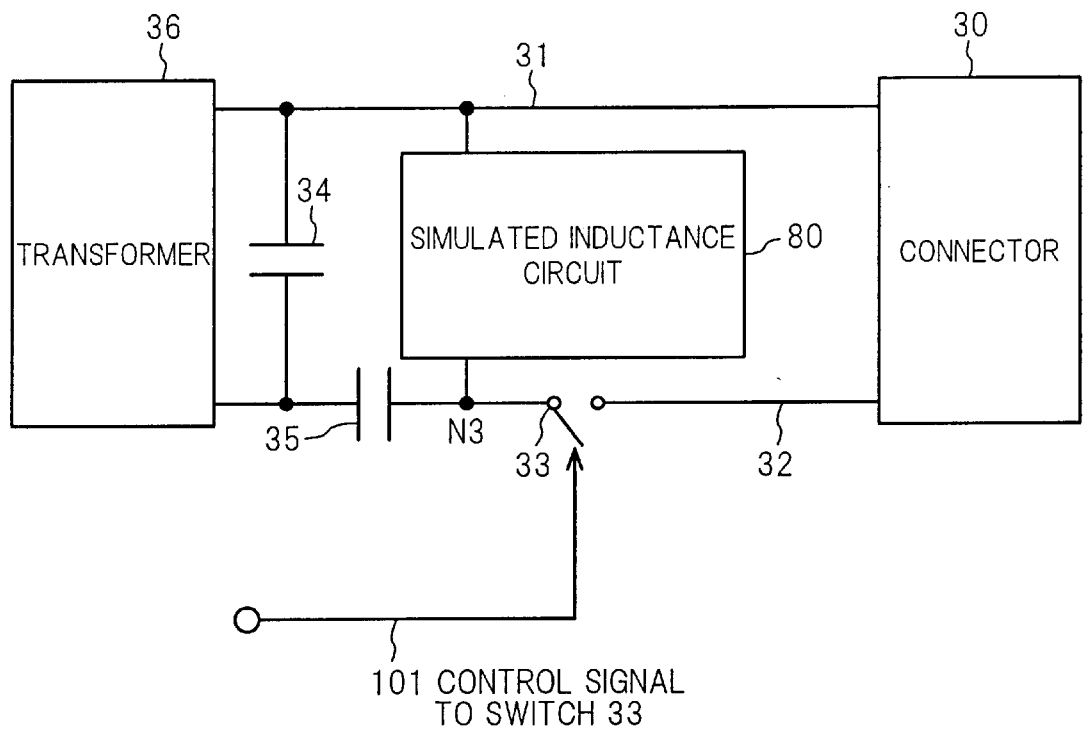
FIG. 1 is a block diagram showing the conventional modem line connection circuit.

A modem line connection circuit and the control method in the preferred embodiments according to the invention will be explained below referring to the drawings.

Figure 3:
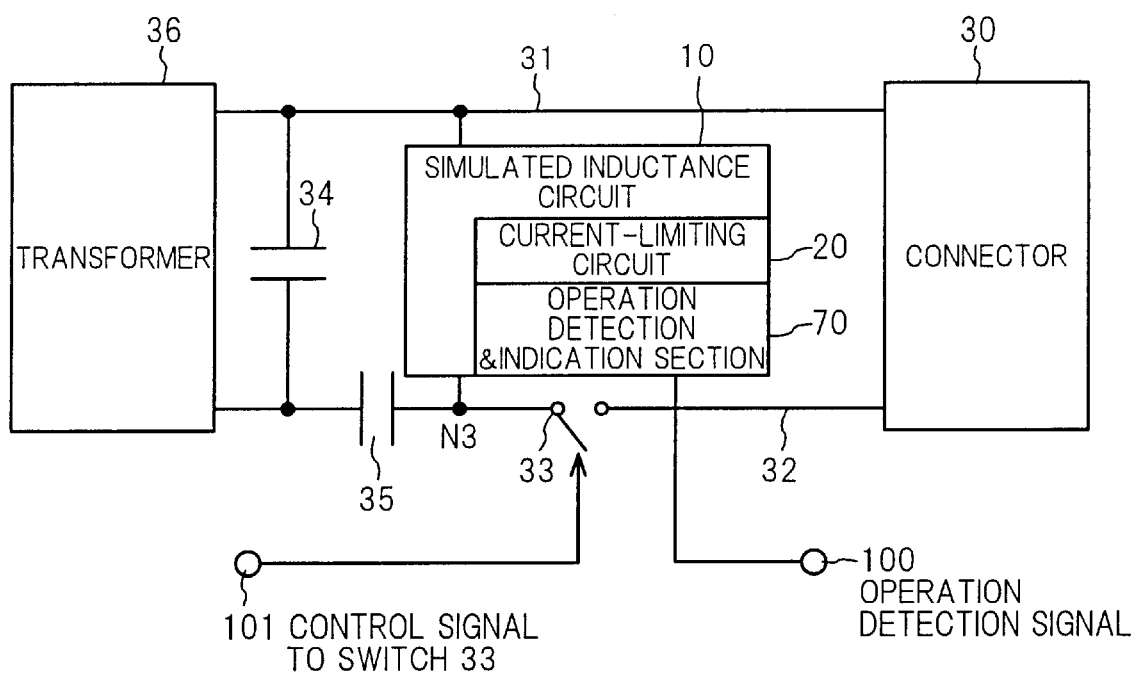
FIG. 3 is a block diagram showing a modem line connection circuit in a first preferred embodiment according to the invention.
Figure 4:
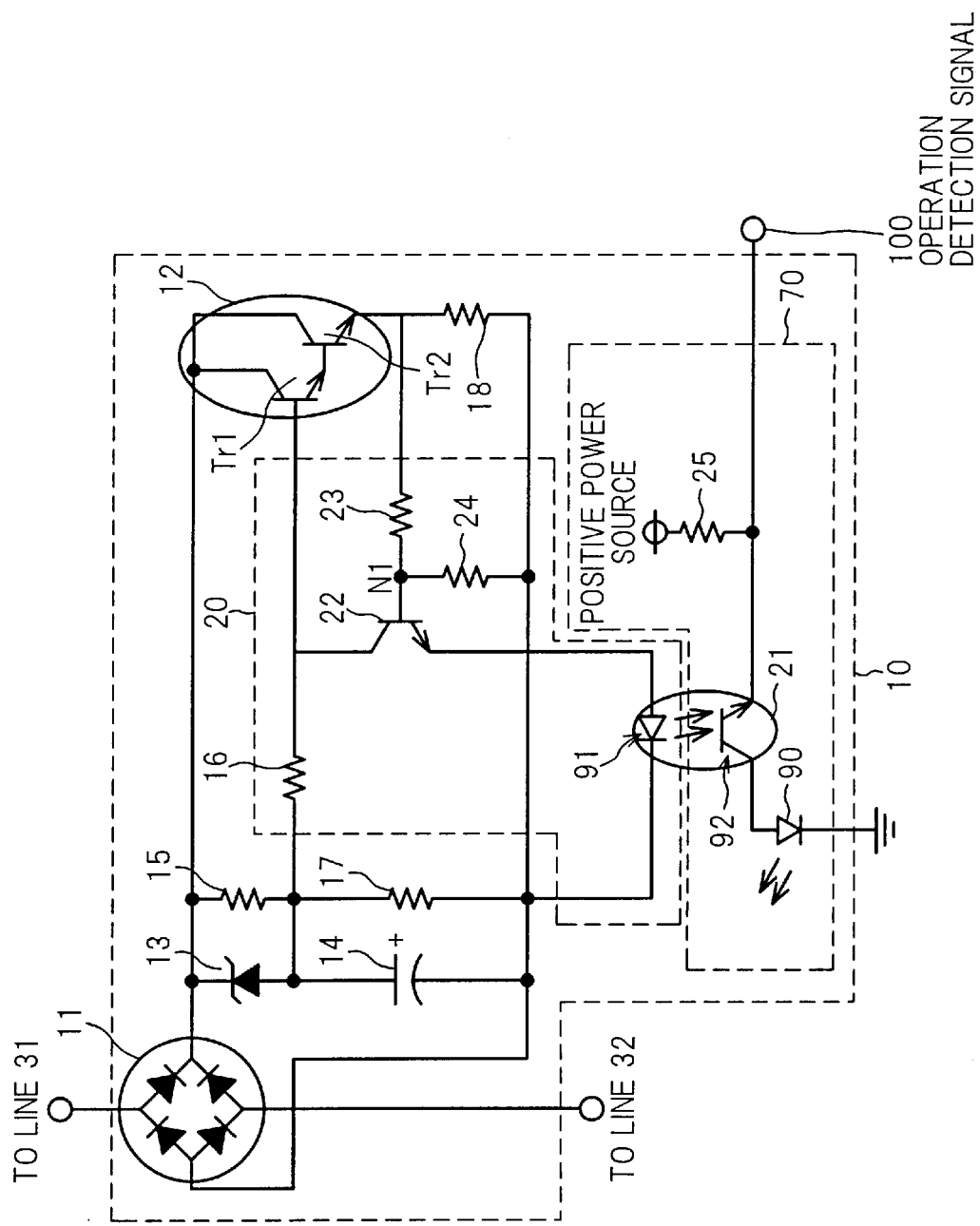
FIG. 4 is a circuit diagram showing a simulated inductance circuit in the first embodiment.

FIG. 3 is a block diagram showing a modem line connection circuit and the control method in the first preferred embodiment according to the invention. FIG. 4 is a circuit diagram showing a simulated inductance circuit in FIG. 3.

In FIGS. 3 and 4, a modem line connection circuit for connecting with public telephone line comprises a simulated inductance circuit 10 composing a dry transformer, a current-limiting circuit 20 which limits excess current to flow through the simulated inductance circuit 10, and an indicator circuit 70 which detects the flow of excess current in response to the operation of the current-limiting circuit 20 and indicates the detection of excess current.

Also, the current-limiting circuit 20 comprises a transistor 22 which detects excess current to flow through a Darlington circuit 12 composing the simulated inductance circuit 10, and a photo-coupler 21 which, when the transistor 22 detects the excess current, turns on to allow signal to be taken out to outside.

Figure 2:
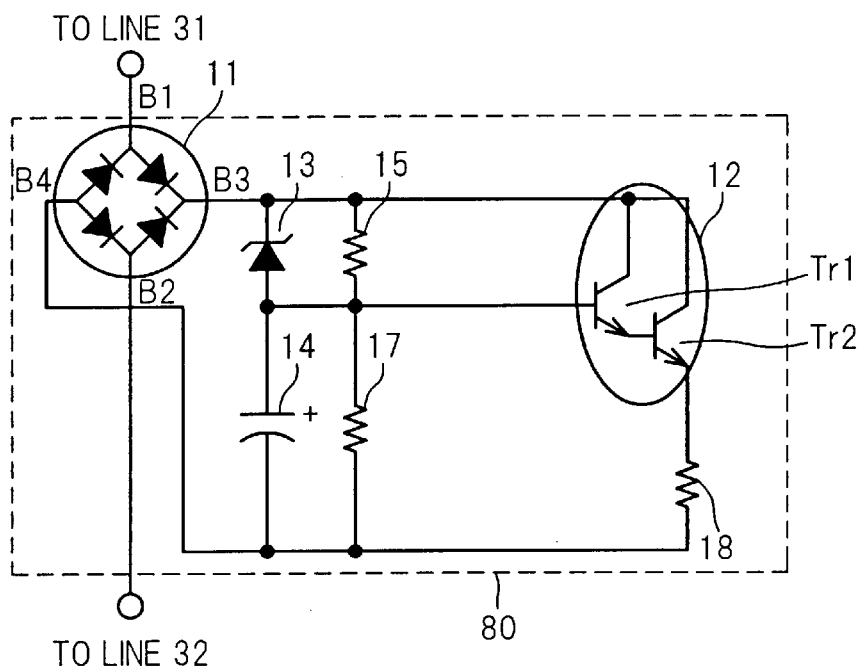
FIG. 2 is a circuit diagram showing the simulated inductance circuit in FIG.1.

Further, the first embodiment is detailed below. Meanwhile, like parts are indicated by like reference numerals used in FIGS. 1 and 2 for the conventional circuits.

In this embodiment, the current-limiting circuit 20 comprises a series circuit of resistances 23 and 24 disposed parallel to the resistance 18, the transistor 22 whose base is connected to connection node N1 between the resistances 23 and 24 and whose collector is connected to the base of the Darlington transistor Tr1, a photodiode 91 of the photo-coupler 21 whose anode is connected to the emitter of the transistor 22 and whose cathode is connected to terminal B4 of the diode bridge 11, and a resistance 16 which is disposed between the anode of the Zener diode 13 and the base of the Darlington transistor Tr1.

Also, in this circuit, a section 70 for detecting the operation of the current-limiting circuit 20 and indicating the detection is provided so that operation detection signal 100 of the current-limiting circuit 20 is taken out through a phototransistor 92 of the photo-coupler 21 and so that a photodiode 90 indicates that the current-limiting circuit 20 is operating.

The operation of the circuit above is explained below.

In normal operation, the current output from the emitter of the Darlington transistor Tr2 is small and the voltage to generate at both ends of the resistive element 18 is therefore low. Therefore, the transistor 22 is in turn-off condition. But, when excess current flows through the Darlington transistor Tr2, the base potential of the transistor 22 increases, thereby the transistor 22 turns on. Then the collector current flows through the transistor 22, thereby the base potential of the transistor Tr1 lowers and the current of the Darlington circuit 12 reduces. Simultaneously the photo-coupler 21 turns on, thereby allowing the current to flow through the photodiode 90 to indicate the flow of excess current.

Figure 5:
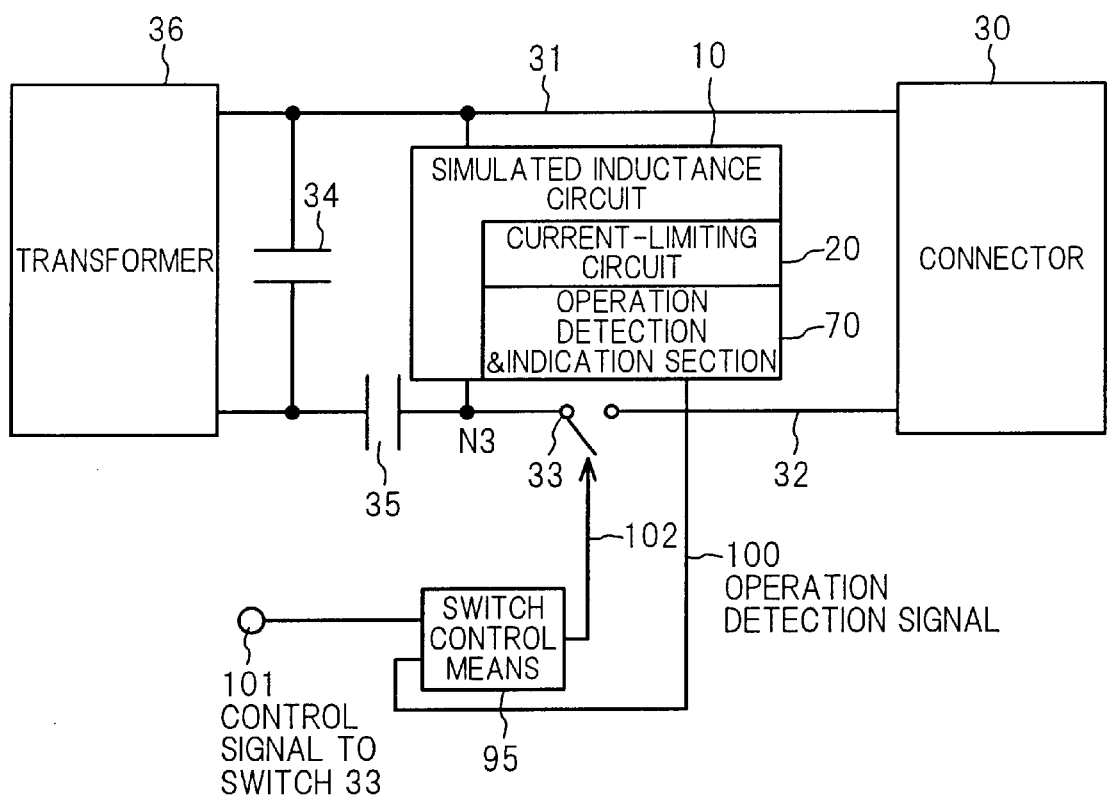
FIG. 5 is a block diagram showing a modem line connection circuit in a second preferred embodiment according to the invention.
Figure 6:
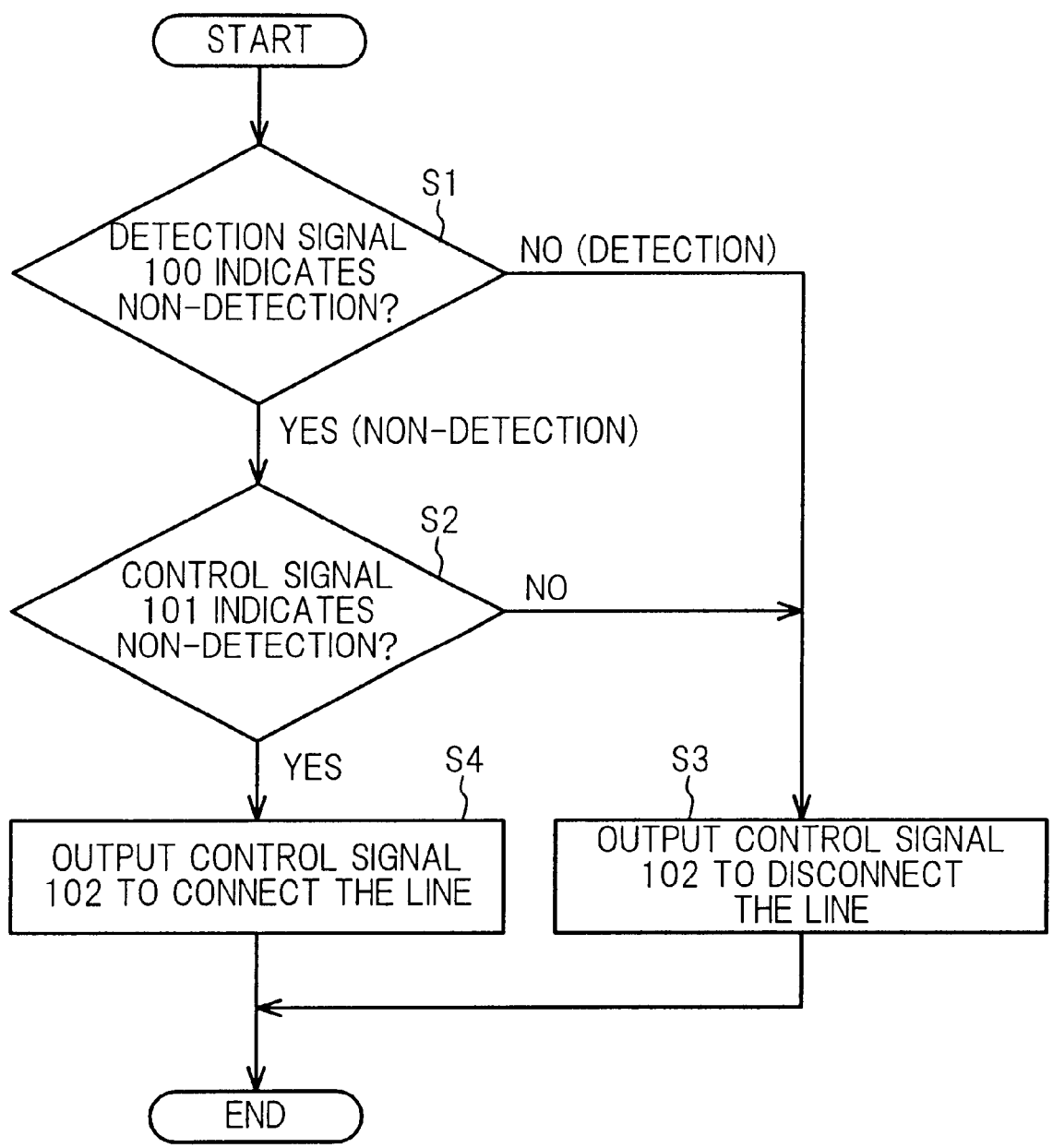
FIG. 6 is a flow chart showing the operation of the modem line connection circuit in the second embodiment.

FIG. 5 is a block diagram showing a modem line connection circuit and the control method in the second preferred embodiment according to the invention. FIG. 6 is a flow chart showing the operation of the modem line connection circuit in the second embodiment.

In FIGS. 5 and 6, the modem line connection circuit further comprises a switch means 33 which makes the operation of the modem line connection circuit stop when the current-limiting circuit 20 operates.

Also, in the modem line connection circuit, the switch 33 for generating dial pulses is controlled so that, when the current-limiting circuit 20 operates, it is turned off (opened) to stop the operation of the modem line connection circuit.

Further, the second embodiment is detailed below.

In the second embodiment, signal from the section 70 for detecting the operation of the current-limiting circuit 20 and indicating the detection is used as one factor to determine the turn-on/off of the line open/close switch 33 for generating dial pulse. Thereby, the opening (disconnection) of line can be rapidly and automatically without requiring the operation of user.

Namely, in FIG. 5, a switch control means 95 is provided so that control signal 102 of the line open/close switch 33 is newly generated from control signal 101 of the line open/close switch 33 and operation detection signal 100 of the current-limiting circuit 20 in FIG. 3.

In operation, referring to the flow chart in FIG. 6, when the current-limiting circuit 20 detects operation detection signal 100, the switch control means 95 outputs control signal 102 to open the line open/close switch 33 to protect the circuit (steps S1 and S2)

On the other hand, when detection signal 100 is not detected, control signal 102 is generated based on control signal 101, and then dial pulses are output (steps S3 and S4).

Thus, in this embodiment, the opening (disconnection) of line can be rapidly and automatically without requiring the operation of user. Therefore, the circuit can be surely protected from excess current.

Advantages of the Invention

In the modem line connection circuit thus composed according to the invention, even when the circuit is connected to PBX digital circuit by mistake, the circuit can be prevented from being destroyed and the user can be promoted to stop the use.

Further, the operation of circuit can also be stopped automatically. Thereby, the failure of circuit can be surely prevented. Also, the simple composition can keep the manufacturing cost low.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A modem line connection circuit for connecting with public telephone line, comprising:

a simulated inductance circuit comprising a dry transformer;

a current-limiting circuit which limits excess current to flow through said simulated inductance circuit;

an indicator circuit which detects the flow of excess current in response to the operation of said current-limiting circuit and indicates the detection of excess current; and a switch means which makes the operation of said modem line connection circuit stop when said current-limiting circuit operates.

2. A modem line connection circuit, according to claim 1, wherein:

said current-limiting circuit comprises a transistor which detects excess current to flow through a Darlington circuit composing said simulated inductance circuit, and a light-emitting diode which, when said transistor detects the excess current, turns on to emit light.

3. A modem line connection circuit for connecting with public telephone line, comprising:

a simulated inductance circuit comprising a dry transformer;

a current-limiting circuit which limits excess current to flow through said simulated inductance circuit;

an indicator circuit which detects the flow of excess current in response to the operation of said current-limiting circuit and indicates the detection of excess current; and a switch means for generating dial pulses is controlled so that, when said current-limiting circuit operates, it is opened to stop the operation of said modem line connection circuit.

4. A modem line connection circuit, according to claim 3, wherein:

said current-limiting circuit comprises a transistor which detects excess current to flow through a Darlington circuit composing said simulated inductance circuit, and a light-emitting diode which, when said transistor detects the excess current, turns on to emit light.

5. A control method for a modem line connection circuit for connecting with public telephone line provided with a simulated inductance circuit composing a dry transformer, comprising the steps of:

detecting excess current to flow through a Darlington circuit composing said simulated inductance circuit and then limiting the excess current up to a predetermined current;

indicating the flow of excess current when the excess current is detected; and making the operation of said modem line connection circuit stop when the excess current is detected.

6. A modem line connection circuit for connecting with a telephone line, comprising:

a simulated inductance circuit;

a current-limiting circuit connected to the simulated inductance circuit;

an indicator circuit connected to the current limiting circuit to indicate an excess current flow through the simulated inductance circuit by monitoring operation of the current-limiting circuit; and a switch means for generating dial pulses controlled so that, when said current-limiting circuit operates, it is opened to stop the operation of said modem line connection circuit.

7. The connection circuit of claim 6, wherein, the simulated inductance circuit comprises a Darlington circuit;

the current-limiting circuit comprises a detecting transistor arranged to detect the excess current flow through the Darlington circuit; and the indicator circuit comprises a photo-coupler activated by the current-limiting circuit and providing a external signal indicating the detection of the excess current.

8. The connection circuit of claim 7, wherein, a base of the detecting transistor is connected to a transistor emitter in the Darlington circuit to detect the excess current flow in the Darlington circuit.

9. The connection circuit of claim 8, wherein, the photo-coupler comprising a photodiode and a phototransistor; and an emitter of the detecting transistor is connected to the photodiode in the indicator circuit, the photodiode being coupled to the phototransistor.

10. The connection circuit of claim 7, wherein, the detecting transistor is biased to turn on upon detecting the excess current flow in the Darlington circuit.

11. The connection circuit of claim 10, wherein, the detecting transistor, upon being turned on, reduces a current flowing through the simulated inductance circuit.

12. The connection circuit of claim 6, wherein, the current limiting circuit, upon being turned on, provides a current to the indicator circuit, the indicator circuit thereupon indicating an excess current flow through the simulated inductance circuit.

* * * * *